Patented Aug. 14, 1945

2,382,714

UNITED STATES PATENT OFFICE 2,382,714

DISSOLVING, SOFTENING, GELATINIZING, AND SWELLING AGENTS

Winfrid Hentrich, Rodleben, near Dessau-Rosslau, Anhalt, Wilhelm Kaiser, Dessau, Anhalt, and Rudolf Endres, Dessau-Rosslau, Anhalt, Germany; vested in the Alien Property Custodian No Drawing. Application July 25, 1939, Serial No. 286,358. In Germany July 27, 1938

6 Claims. (Cl. 260—36)

This invention relates to new dissolving, softening, gelatinizing and swelling agents comprising heterocyclic compounds having in the ring at least one —C(SR)=N— group or its isomer,

wherein R is an organic radical containing a hydrocarbon group.

In the copending application Ser. No. 267,622, filed April 13, 1939, now Patent No. 2,306,440, issued December 29, 1942, heterocyclic compounds containing at least one —C(OR)=N— group, wherein R represents any desired acyclic or cyclic hydrocarbon group, are described as new dissolving, softening, gelatinizing and swelling agents and especially as modifying agents when employed in combination with cellulose derivatives, natural and synthetic resins, synthetic polymerization products, natural and artificial caoutchouc and the like. These compounds are also disclosed as being suitable for use in the production of various articles of manufacture such as films, sheets, threads, ribbons, coatings, adhesives, putties, impregnation agents, fillers, plastics, and various other derivatives of natural and synthetic products. For instance, the examples show cellulose nitrate lacquers incorporating from about 21–38 per cent of the aforesaid cyanuric acid esters, as compared to the cellulose nitrate, as the plasticizing agent.

In accordance with the present invention, heterocyclic compounds having in the ring at least one —C(SR)=N— group or its isomer,

wherein R is any desirable acyclic or cyclic organic radical containing a hydrocarbon group, are employed advantageously in the same compositions as the compounds hereinbefore referred to. The hydrocarbon radicals of the compounds of the present invention may be uninterrupted or may be interrupted by hetero-atoms or hetero-atomic groups containing such atoms as oxygen, sulfur, nitrogen or halogen.

Since the appropriate isomeric structural formula for the various heterocyclic plasticizing compounds of this invention has not been definitely established, the nuclear sulfur-containing radicals appearing in the rings of the heterocyclic compounds have been designated collectively hereinafter as —C(SR)=N— groups.

Among the broad class of compounds useful for the purposes of the invention and having at least one —C(SR)=N— group or its isomeric group are derivatives of such compounds as the oxazols, the thiazols, the imidazols and the like, especially their benzo derivatives; the pyridines and their benzo derivatives; the di- and triazines and as well the triazols.

The sulfur compounds of this invention may be obtained, for instance, by the conversion of the corresponding halogen compounds, that is, compounds containing at least one —C(hal)=N— groups with acyclic and cyclic mercaptans desirably in the presence of an acid-binding agent.

In accordance with another practice, compounds having the desired structure are obtained by reacting the metal derivatives of compounds containing at least one —C(SH)=N— groups with halogen alkyls or other halogen hydrocarbons wherein metal halogenides are separated out.

In accordance with a preferred embodiment of the invention the new dissolving, softening, gelatinizing, and swelling agents are provided by processes using triazines, such as cyanuric acid. For instance such condensation products are obtained by condensing cyanuric chloride with methyl-, butyl-, lauryl-, octadecyl-, oleyl-, cyclohexyl-, alkyl cyclohexyl-, naphthenyl-, abietyl-, and benzyl mercaptans; also with thiophenols, permissibly nuclear alkylated with long or short chains. Such compounds include the 2,4,6-tri-(beta-hydroxyethyl-mercapto)-1,3,5-triazine, and 2,4,6-tri-(beta, gamma-dihydroxy propyl-mercapto)-1,3,5-triazine. One, two, or three similar or dissimilar mercapto groups may be introduced into the cyanuric acid radical. Where desirable alcoholic groups may be present as, for instance, in 2,4-butyl mercapto-6-methoxy-1,3,5-triazine or in 2,6-butyl mercapto-4-butoxy-1,3,5-triazine. The foregoing mercaptans may also contain hetero-atoms such as halogen, oxygen, sulfur, nitrogen, or, hetero-atomic groups containing these atoms.

In accordance with another method of practicing the invention diazine derivaives are employed for the purposes hereinbefore disclosed. For instance, suitable compounds include: 2, 4-di-ethylmercapto - quinazoline, 2,4-di-butyl - mercaptoquinazoline, 2,4-di-dodecyl - mercapto - quinazoline, 2,4-di-(butyl mercapto)-6-methyl pyrimidine, 2,3-di-butyl mercapto quinoxaline, and the like.

In accordance with yet another embodiment of the invention, heterocyclic compounds containing only one —C(SR)=N— group are employed for the purposes of the invention. Such compounds include: 2-ethyl mercapto-benzoxazol, 2-butyl mercapto-benzoxazol, 2-phenyl mercapto benzoxazol, 2-dodecyl mercapto-thiazol, 2-beta-hydroxy-ethyl mercapto-benzo-thiazol, 2-beta-ethyl mercapto-benzo-thiazol, 2-butyl mercapto-benzothiazol, 2-n-octyl mercapto-benzo-thiazol, 2-octadecyl mercapto-benzo-thiazol, 2-n-beta-ethyl hexyl mercapto-benzo-thiazol, 2-octyl mercapto-benzimidazol, alpha-octyl mercapto-pyridine, alpha-dodecyl mercapto-pyridine, and the like.

The heterocyclic compounds of this invention are suitable as dissolving, softening, gelatinizing, and swelling agents in a variety of fields, but are especially useful with cellulosic compositions, natural and synthetic resins, natural and synthetic rubber, and with polymerization products in general. They form suitable dissolving, softening, gelatinizing, and swelling agents for such cellulosic derivatives as cellulose esters and ethers, such as nitrocellulose, lower molecular fatty acid esters of cellulose, such as formyl-, triacetyl-, acetyl-cellulose and the like; likewise, for natural and synthetic resins and waxes and polymerization products, such as, copals, colophony, phthalic acid, glycerine ester resins, phenol formaldehyde resins, aniline formaldehyde resins, urea formaldehyde resins, gutta percha, balata, pitch, asphalt and the like.

The agents of the instant invention have the desirable property of being compatible with other materials which are customarily used in the production of various articles of manufacture incorporating cellulose derivatives and other natural and synthetic products just mentioned. They are compatible, for example, with other materials used in the production of such articles as films, sheets, plates, threads, ribbons, tubes, coatings, plastic masses and the like. For instance, they are compatible with mineral, vegetable and animal oils, as well as with other softeners. These and the other desirable properties of the condensation products of this invention make them useful in the production of commercial fabricated products of various kinds, such as, adhesives, putties, impregnation agents, insulators, fillers, synthetic products, plastics, and the like.

The following examples, in which the parts are expressed in parts by weight, taken in connection with the prior mentioned application will serve to illustrate the products, processes, and uses of the products included within the invention but they are not to be interpreted as limitations upon the scope of the invention.

*Example 1*

The sodium derivative of mercapto-benzothiazol is condensed with octyl chloride. Then 100 parts of vinyl polymerization product are kneaded together with 25 parts of the resulting 2-(n-octyl mercapto)-benzo-thiazol until a homogeneous mass is obtained. This mass may be pressed in the usual manner and yields highly elastic coatings having excellent electrical insulating properties.

*Example 2*

One mole of cyanuric chloride is condensed with 3 moles of ethyl mercaptan producing triethyl mercapto-triazine. Then 5 parts of this condensation product are stirred into a solution consisting of 10 parts of vinyl polymerization product, 30 parts of ethyl acetate, 30 parts of xylol and 30 parts of acetone. The resulting lacquer forms very tough waterproof coatings.

It should be understood that the present invention is not limited to the specific processes, compounds, and compositions herein disclosed but that it extends to all equivalents which one skilled in the art would consider within the scope of the appended claims.

We claim:

1. A plastic composition comprising a plastic base material selected from the group consisting of cellulose ethers, cellulose esters, and resins, and as a plasticizing agent for said base material, a heterocyclic compound composed of a single heterocyclic nucleus having as a part of its nuclear ring structure at least one —C(SR)=N— group in which R is a hydrocarbon radical.

2. A plastic composition comprising a plastic base material selected from the group consisting of cellulose ethers, cellulose esters, and resins, and as a plasticizing agent for said base material, a heterocyclic compound composed of a single heterocyclic nucleus having as a part of its nuclear ring structure at least one —C(SR)=N— group in which R is a hydrocarbon group of at least two carbon atoms.

3. A plastic composition comprising a plastic base material selected from the group consisting of cellulose ethers, cellulose esters, and resins, and as a plasticizing agent for said base material, a heterocyclic compound composed of a single triazine nucleus having as a part of its nuclear ring structure at least one —C(SR)=N— group in which R is a hydrocarbon group of at least two carbon atoms.

4. A plastic composition comprising a plastic base material selected from cellulose ethers, cellulose esters, and resins and as a plasticizing agent for said base material, a single triazine nucleus having as a part of its ring structure three —C(SR)=N— groups wherein R is an aliphatic hydrocarbon group of at least 2 carbon atoms.

5. A surface coating composition comprising a vinyl resin as a plastic base material and triethyl mercapto triazine as a plasticizing agent for said base material.

6. A plastic composition comprising a plastic base material selected from the group consisting of cellulose ethers, cellulose esters, and resins, and as a plasticizing agent for said base material, a heterocyclic compound composed of a single triazine nucleus having as a part of its nuclear ring structure at least one —C(SR)=N— group in which R is a hydrocarbon radical.

WINFRID HENTRICH.
WILHELM KAISER.
RUDOLF ENDRES.